(12) United States Patent
Erivantcev et al.

(10) Patent No.: US 11,009,941 B2
(45) Date of Patent: May 18, 2021

(54) CALIBRATION OF MEASUREMENT UNITS IN ALIGNMENT WITH A SKELETON MODEL TO CONTROL A COMPUTER SYSTEM

(71) Applicant: Finch Technologies Ltd., Tortola (VG)

(72) Inventors: Viktor Vladimirovich Erivantcev, Ufa (RU); Alexander Sergeevich Lobanov, Ufa (RU); Alexey Ivanovich Kartashov, Moscow (RU); Daniil Olegovich Goncharov, Ufa (RU); Ratmir Rasilevich Gubaidullin, Ufa (RU)

(73) Assignee: Finch Technologies Ltd., Tortola (VG)

( * ) Notice: Subject to any disclaimer, the term of this patent is extended or adjusted under 35 U.S.C. 154(b) by 9 days.

(21) Appl. No.: 16/044,984

(22) Filed: Jul. 25, 2018

(65) Prior Publication Data
US 2020/0033937 A1 Jan. 30, 2020

(51) Int. Cl.
*G06F 3/01* (2006.01)
*G06F 3/0346* (2013.01)
(Continued)

(52) U.S. Cl.
CPC .............. *G06F 3/011* (2013.01); *G06F 3/012* (2013.01); *G06F 3/017* (2013.01); *G06F 3/0346* (2013.01);
(Continued)

(58) Field of Classification Search
CPC .... G06F 3/011; G06F 3/0346; G06F 3/04815; G06F 3/012; G06F 3/017; G06F 3/014;
(Continued)

(56) References Cited

U.S. PATENT DOCUMENTS

| 5,515,477 A | 5/1996 | Sutherland |
| 8,187,100 B1 | 5/2012 | Kahn et al. |

(Continued)

FOREIGN PATENT DOCUMENTS

| CN | 103226398 | 7/2013 |
| WO | 2016183812 | 11/2016 |
| WO | 2016209819 | 12/2016 |

OTHER PUBLICATIONS

Accessories for Vive, retrieved from https://www.vive.com/us/accessory/ on Jan. 30, 2017.
(Continued)

*Primary Examiner* — Patrick N Edouard
*Assistant Examiner* — Joseph P Fox
(74) *Attorney, Agent, or Firm* — Greenberg Traurig

(57) ABSTRACT

A system having a plurality of sensor modules and a stereo camera and a computing device. Each sensor module has an inertial measurement unit (IMU) measuring its orientation relative to a reference orientation. Different IMUs may have different reference orientations. To calibrate the IMUs with respect to a common reference (e.g., defined based on a standardized pose of a user), the stereo camera captures a stereo image of a respective sensor module attached to a respective portion of the user; the inertial measurement unit of the respective sensor module generates an orientation measurement at a time of capturing the stereo image; and the computing device calculates, based on the stereo image, at least one orientation and uses the orientation and the orientation measurement in determining a rotation that calibrates measurements of the inertial measurement unit relative to the common reference.

20 Claims, 8 Drawing Sheets

(51) Int. Cl.

| | | |
|---|---|---|
| *G06F 3/0481* | (2013.01) | |
| *G06T 7/70* | (2017.01) | |
| *G06T 7/00* | (2017.01) | |
| *G06N 5/04* | (2006.01) | |
| *G06T 7/246* | (2017.01) | |
| *G06N 3/04* | (2006.01) | |
| *G06N 3/08* | (2006.01) | |

(52) U.S. Cl.
CPC ....... *G06F 3/04815* (2013.01); *G06N 3/0454* (2013.01); *G06N 3/08* (2013.01); *G06N 5/046* (2013.01); *G06T 7/246* (2017.01); *G06T 7/251* (2017.01); *G06T 7/70* (2017.01); *G06T 7/97* (2017.01); *G06N 3/0427* (2013.01); *G06T 2207/10021* (2013.01); *G06T 2207/20081* (2013.01); *G06T 2207/20084* (2013.01); *G06T 2207/30196* (2013.01); *G06T 2207/30204* (2013.01)

(58) Field of Classification Search
CPC ... G06T 7/97; G06T 7/70; G06T 2207/30204; G06T 2207/30196; G06T 2207/20081; G06T 2207/20084; G06T 2207/10021; G06T 7/251; G06T 7/246; G06N 5/046; G06N 3/0427; G06N 3/0454; G06N 3/08
See application file for complete search history.

(56) References Cited

U.S. PATENT DOCUMENTS

| | | | |
|---|---|---|---|
| 8,933,886 B2 | 1/2015 | Imoto et al. | |
| 8,988,438 B2 | 3/2015 | Bang et al. | |
| 9,141,194 B1 | 9/2015 | Keyes et al. | |
| 9,278,453 B2 | 3/2016 | Assad | |
| 9,405,372 B2 | 8/2016 | Yen et al. | |
| D772,986 S | 11/2016 | Chen et al. | |
| 9,504,414 B2 | 11/2016 | Coza et al. | |
| 9,600,925 B2 | 3/2017 | Katz et al. | |
| 9,827,496 B1 | 11/2017 | Zinno | |
| 9,891,718 B2 | 2/2018 | Connor | |
| 9,996,945 B1 | 6/2018 | Holzer et al. | |
| 10,019,806 B2 | 7/2018 | Perry et al. | |
| 10,379,613 B2 | 8/2019 | Erivantcev et al. | |
| 10,416,755 B1 | 9/2019 | Erivantcev et al. | |
| 10,509,464 B2 | 12/2019 | Erivantcev et al. | |
| 10,509,469 B2 | 12/2019 | Erivantcev et al. | |
| 10,521,011 B2 | 12/2019 | Erivantcev et al. | |
| 10,534,431 B2 | 1/2020 | Erivantcev et al. | |
| 10,540,006 B2 | 1/2020 | Erivantcev et al. | |
| 10,635,166 B2 | 4/2020 | Erivantcev et al. | |
| 10,705,113 B2 | 7/2020 | Erivantcev et al. | |
| 10,838,495 B2 | 11/2020 | Erivantcev et al. | |
| 10,860,091 B2 | 12/2020 | Erivantcev et al. | |
| 2003/0142065 A1 | 7/2003 | Pahlavan | |
| 2003/0193572 A1* | 10/2003 | Wilson | G06F 3/0346 348/207.99 |
| 2007/0050597 A1 | 3/2007 | Ikeda | |
| 2007/0273610 A1 | 11/2007 | Baillot | |
| 2008/0088468 A1 | 4/2008 | Kim | |
| 2008/0262772 A1 | 10/2008 | Luinge et al. | |
| 2009/0322763 A1* | 12/2009 | Bang | G06F 3/011 345/474 |
| 2010/0079466 A1 | 4/2010 | Griffin | |
| 2010/0194879 A1 | 8/2010 | Pasveer et al. | |
| 2010/0307241 A1 | 12/2010 | Raman et al. | |
| 2011/0025853 A1* | 2/2011 | Richardson | H04N 5/2256 348/159 |
| 2011/0161804 A1 | 6/2011 | Park et al. | |
| 2011/0228251 A1 | 9/2011 | Yee et al. | |
| 2012/0025945 A1 | 2/2012 | Yazadi et al. | |
| 2012/0130203 A1 | 5/2012 | Stergiou et al. | |
| 2012/0214591 A1 | 8/2012 | Ito et al. | |
| 2012/0293410 A1 | 11/2012 | Bell | |
| 2013/0317648 A1 | 11/2013 | Assad | |
| 2014/0028547 A1 | 1/2014 | Bromley et al. | |
| 2014/0201689 A1 | 7/2014 | Bedikian et al. | |
| 2014/0313022 A1 | 10/2014 | Moeller et al. | |
| 2015/0062086 A1 | 3/2015 | Nattukallingal | |
| 2015/0077347 A1 | 3/2015 | OGreen | |
| 2015/0145860 A1 | 5/2015 | Craig et al. | |
| 2015/0145985 A1 | 5/2015 | Gourlay et al. | |
| 2015/0154453 A1* | 6/2015 | Wilf | G06K 9/00711 382/103 |
| 2015/0177842 A1 | 6/2015 | Rudenko | |
| 2015/0213653 A1 | 7/2015 | Kord | |
| 2015/0277559 A1 | 10/2015 | Vescovi et al. | |
| 2015/0358543 A1 | 12/2015 | Kord | |
| 2016/0005232 A1 | 1/2016 | Quarles | |
| 2016/0054797 A1 | 2/2016 | Tokubo et al. | |
| 2016/0077608 A1 | 3/2016 | Nakasu et al. | |
| 2016/0085310 A1 | 3/2016 | Shotton et al. | |
| 2016/0187969 A1 | 6/2016 | Larsen et al. | |
| 2016/0306431 A1 | 10/2016 | Stafford et al. | |
| 2016/0313798 A1 | 10/2016 | Connor | |
| 2016/0335486 A1 | 11/2016 | Fleishman et al. | |
| 2016/0338644 A1 | 11/2016 | Connor | |
| 2016/0378204 A1 | 12/2016 | Chen et al. | |
| 2017/0053454 A1 | 2/2017 | Katz et al. | |
| 2017/0083084 A1 | 3/2017 | Tatsuta et al. | |
| 2017/0115728 A1 | 4/2017 | Park et al. | |
| 2017/0147066 A1 | 5/2017 | Katz et al. | |
| 2017/0168586 A1 | 6/2017 | Sinha et al. | |
| 2017/0186226 A1 | 6/2017 | Cashman et al. | |
| 2017/0308165 A1 | 10/2017 | Erivantcev et al. | |
| 2017/0344829 A1 | 11/2017 | Lan et al. | |
| 2017/0347885 A1 | 12/2017 | Tan et al. | |
| 2017/0352188 A1 | 12/2017 | Levitt | |
| 2017/0371403 A1 | 12/2017 | Wetzler et al. | |
| 2018/0008196 A1 | 1/2018 | Connor | |
| 2018/0020978 A1 | 1/2018 | Kaifosh et al. | |
| 2018/0095637 A1 | 4/2018 | Valdivia et al. | |
| 2018/0101989 A1 | 4/2018 | Frueh et al. | |
| 2018/0106618 A1 | 4/2018 | Cerchio et al. | |
| 2018/0122098 A1* | 5/2018 | Wang | G06T 7/75 |
| 2018/0165879 A1 | 6/2018 | Holzer et al. | |
| 2018/0217680 A1 | 8/2018 | Sudou et al. | |
| 2018/0225517 A1 | 8/2018 | Holzer et al. | |
| 2018/0253142 A1 | 9/2018 | Tsuchie et al. | |
| 2018/0293756 A1 | 10/2018 | Liu et al. | |
| 2018/0313867 A1 | 11/2018 | Erivantcev et al. | |
| 2018/0330521 A1* | 11/2018 | Samples | A63F 13/211 |
| 2018/0335834 A1 | 11/2018 | Erivantcev et al. | |
| 2018/0335843 A1 | 11/2018 | Erivantcev et al. | |
| 2018/0335855 A1 | 11/2018 | Erivantcev et al. | |
| 2018/0350105 A1 | 12/2018 | Taylor et al. | |
| 2019/0187784 A1 | 6/2019 | Erivantcev et al. | |
| 2019/0212359 A1 | 7/2019 | Erivantcev et al. | |
| 2019/0212807 A1 | 7/2019 | Erivantcev et al. | |
| 2019/0332171 A1 | 10/2019 | Erivantcev et al. | |
| 2019/0339766 A1 | 11/2019 | Erivantcev et al. | |
| 2019/0369715 A1 | 12/2019 | Erivantcev et al. | |
| 2020/0073483 A1 | 3/2020 | Berenzweig et al. | |
| 2020/0081534 A1 | 3/2020 | Erivantcev et al. | |
| 2020/0225738 A1 | 7/2020 | Erivantcev et al. | |

OTHER PUBLICATIONS

Daydream, retrieved from https://vr.google.com/daydream/ on Jan. 30, 2017.

Forward kinematics, Wikipedia, retrieved from https://en.wikipedia.org/wiki/Forward_kinematics on Sep. 21, 2017.

Gest—Work with your hands. Wayback Machine 2016. Retrieved from https://web.archive.org/web/20160304012247/https://gest.co/ on Jan. 30, 2017.

Gloveone: Feel Virtual Reality. Wayback Machine 2016. Retrieved from https://web.archive.org/web/20160307080001/https://www.gloveonevr.com/ on Jan. 30, 2017.

International Application No. PCT/US2017/028982, International Search Report and Written Opinion, dated Aug. 24, 2017.

Manus VR—The Pinnacle of Virtual Reality Controllers, Manus VR Development Kit Pro Q4 2016.

(56) References Cited

OTHER PUBLICATIONS

Manus VR—The virtual reality dataglove for consumers. Wayback Machine 2016. Retrieved from https://web.archive.org/web/20160417035626/https://manusvr. com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/ rift/ on Jan. 30, 2017.
RevolVR Virtual Reality Controllers, retrieved from http://revolvr.co/ on Jan. 30, 2017.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllers/xbox-wireless-controller on Jan. 30, 2017.
Ben Lang, "Google Demonstrates Promising Low-cost, Mobile Inside-out Controller Tracking", https://www.roadtovr.com/google-mobile-6dof-vr-controller-tracking-inside-out/, Apr. 28, 2018.
Ben Lang, "Oculus Claims Breakthrough in Hand-tracking Accuracy", https://www.roadtovr.com/oculus-claims-breakthrough-in-hand-tracking-accuracy/, May 3, 2018.
Camera Calibration and 3D Reconstruction, OpenCV 2.4.13.6 documentation, https://docs.opencv.org/2.4/modules/calib3d/doc/camera_calibration_and_3d_reconstruction.html, printed on Jun. 11, 2018.
Forward kinematics, Wikipedia, printed on Sep. 21, 2017.
Kinematic chain, Wikipedia, printed on Apr. 23, 2018.
Reinforcement learning, Wikipedia, printed on Apr. 25, 2018.
Stereo camera, Wikipedia, printed on Jun. 29, 2018.
Supervised learning, Wikipedia, printed on Apr. 25, 2018.
International Search Report and Written Opinion, PCT/US2020/047222, dated Nov. 5, 2020.
Title: Devices for Controlling Computers Based on Motions and Positions of Hands U.S. Appl. No. 15/492,915, filed Apr. 20, 2017 Inventors: Viktor Erivantcev et al. Status: Patented Case Status Date: Nov. 26, 2019.
Title: Devices for Controlling Computers Based on Motions and Positions of Hands U.S. Appl. No. 16/683,648, filed Nov. 14, 2019 Inventors: Viktor Erivantcev et al. Status: Notice of Allowance dated Jul. 17, 2020.
Title: Calibration of Inertial Measurement Units Attached to Arms of a User to Generate Inputs for Computer Systems U.S. Appl. No. 15/817,646, filed Nov. 20, 2017 Inventors: Viktor Erivantcev et al. Status: Patented Case Status Date: Jun. 17, 2020.
Title: Tracking Arm Movements to Generate Inputs for Computer Systems U.S. Appl. No. 15/792,255, filed Oct. 18, 2017 Inventors: Viktor Erivantcev et al. Status: Patented Case Status Date: Jul. 24, 2019.
Title: Tracking Finger Movements to Generate Inputs for Computer Systems U.S. Appl. No. 15/792,255, filed Oct. 24, 2017 Inventors: Viktor Erivantcev et al. Status: Patented Case Status Date: Dec. 24, 2019.
Title: Tracking Arm Movements to Generate Inputs for Computer Systems U.S. Appl. No. 16/508,249, filed Jul. 10, 2019 Inventors: Viktor Erivantcev et al. Status: Final Rejection dated Jun. 17, 2020.
Title: Tracking Torso Orientation to Generate Inputs for Computer Systems U.S. Appl. No. 15/813,813, filed Nov. 15, 2017 Inventors: Viktor Erivantcev et al. Status: Patented Case Status Date: Jan. 1, 2020.
Title: Calibration of Inertial Measurement Units Attached to Arms of a User and to a Head Mounted Device U.S. Appl. No. 15/847,669, filed Dec. 19, 2017 Inventors: Viktor Erivantcev et al. Status: Patented Case Status Date: Dec. 11, 2019.
Title: Correction of Accumulated Errors in Inertial Measurement Units Attached to a User U.S. Appl. No. 15/868,745, filed Jan. 11, 2018 Inventors: Viktor Erivantcev et al. Status: Final Rejection dated Jul. 14, 2020.
Title: Tracking Torso Leaning to Generate Inputs for Computer Systems U.S. Appl. No. 15/864,860, filed Jan. 8, 2018 Inventors: Viktor Erivantcev et al. Status: Patented Case Status Date: Nov. 26, 2019.
Title: Tracking User Movements to Control a Skeleton Model in a Computer System U.S. Appl. No. 15/973,137, filed May 7, 2018 Inventors: Viktor Erivantcev et al. Status: Final Rejection dated Sep. 11, 2019.
Title: Motion Predictions of Overlapping Kinematic Chains of a Skeleton Model Used to Control a Computer System U.S. Appl. No. 15/996,389, filed Jun. 1, 2018 Inventors: Viktor Erivantcev et al. Status: Patented Case Status Date: Aug. 28, 2019.
Title: Motion Predictions of Overlapping Kinematic Chains of a Skeleton Model Used to Control a Computer System U.S. Appl. No. 16/532,880, filed Aug. 6, 2019 Inventors: Viktor Erivantcev et al. Status: Patented Case Status Date: Apr. 8, 2020.
Title: Motion Predictions of Overlapping Kinematic Chains of a Skeleton Model Used to Control a Computer System U.S. Appl. No. 16/827,573, filed Mar. 23, 2020 Inventors: Viktor Erivantcev et al. Status: Notice of Allowance dated Aug. 4, 2020.
Title: Calibration of Inertial Measurement Units in Alignment with a Skeleton Model to Control a Computer System based on Determination of Orientation of an Inertial Measurement Unit from an Image of a Portion of a User U.S. Appl. No. 16/576,661, filed Sep. 19, 2019 Inventors: Viktor Erivantcev et al. Status: Non Final Action dated Aug. 27, 2020.
Title: Orientation Determination based on Both Images and Inertial Measurement Units U.S. Appl. No. 16/576,672, filed Sep. 19, 2019 Inventors: Viktor Erivantcev et al. Status: Docketed New Case—Ready for Examination Status Date: Oct. 28, 2019.

* cited by examiner

CALIBRATION OF MEASUREMENT UNITS IN ALIGNMENT WITH A SKELETON MODEL TO CONTROL A COMPUTER SYSTEM

RELATED APPLICATIONS

The present application relates to U.S. patent application Ser. No. 15/973,137, filed May 7, 2018 and entitled "Tracking User Movements to Control a Skeleton Model in a Computer System," U.S. patent application Ser. No. 15/868,745, filed Jan. 11, 2018 and entitled "Correction of Accumulated Errors in Inertial Measurement Units Attached to a User," U.S. patent application Ser. No. 15/864,860, filed Jan. 8, 2018 and entitled "Tracking Torso Leaning to Generate Inputs for Computer Systems," U.S. patent application Ser. No. 15/847,669, filed Dec. 19, 2017 and entitled "Calibration of Inertial Measurement Units Attached to Arms of a User and to a Head Mounted Device," U.S. patent application Ser. No. 15/817,646, filed Nov. 20, 2017 and entitled "Calibration of Inertial Measurement Units Attached to Arms of a User to Generate Inputs for Computer Systems," U.S. patent application Ser. No. 15/813,813, filed Nov. 15, 2017 and entitled "Tracking Torso Orientation to Generate Inputs for Computer Systems," U.S. patent application Ser. No. 15/792,255, filed Oct. 24, 2017 and entitled "Tracking Finger Movements to Generate Inputs for Computer Systems," U.S. patent application Ser. No. 15/787,555, filed Oct. 18, 2017 and entitled "Tracking Arm Movements to Generate Inputs for Computer Systems," and U.S. patent application Ser. No. 15/492,915, filed Apr. 20, 2017 and entitled "Devices for Controlling Computers based on Motions and Positions of Hands." The entire disclosures of the above-referenced related applications are hereby incorporated herein by reference.

FIELD OF THE TECHNOLOGY

At least a portion of the present disclosure relates to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. App. Pub. No. 2016/0085310 discloses techniques to track hand or body pose from image data in which a best candidate pose from a pool of candidate poses is selected as the current tracked pose.

U.S. Pat. App. Pub. No. 2017/0344829 discloses an action detection scheme using a recurrent neural network (RNN) where joint locations are applied to the recurrent neural network (RNN) to determine an action label representing the action of an entity depicted in a frame of a video.

U.S. Pat. App. Pub. No. 2017/0186226 discloses a calibration engine that uses a machine learning system to extracts a region of interest to compute values of shape parameters of a 3D mesh model.

U.S. Pat. App. Pub. No. 2017/0186226 discloses a system where an observed position is determined from an image and a predicted position is determined using an inertial measurement unit. The predicted position is adjusted by an offset until a difference between the observed position and the predicted position is less than a threshold value.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
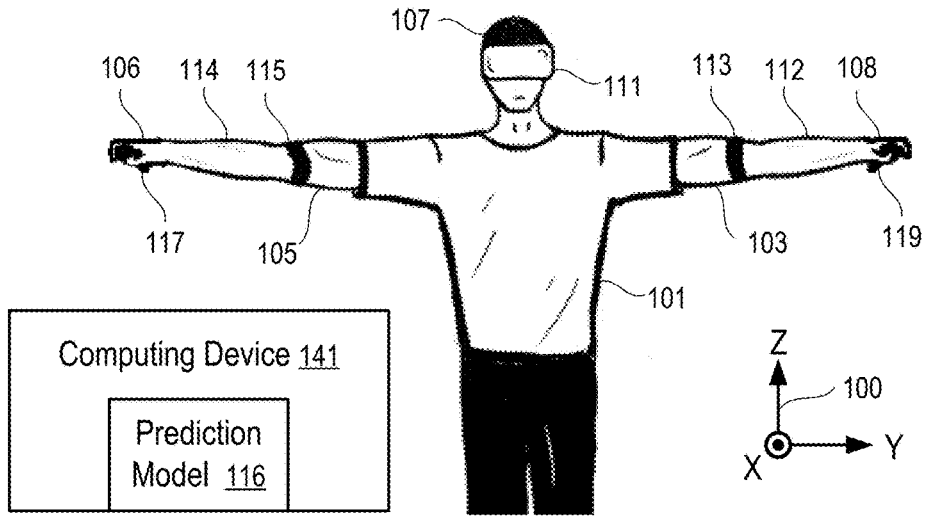
FIG. 1 illustrates a system to track user movements according to one embodiment.

The following description and drawings are illustrative and are not to be construed as limiting. Numerous specific details are described to provide a thorough understanding. However, in certain instances, well known or conventional details are not described to avoid obscuring the description. References to one or an embodiment in the present disclosure are not necessarily references to the same embodiment; and, such references mean at least one.

In general, uncalibrated measurements of an inertial measurement unit (IMU) can be considered as orientations of the inertial sensor measured relative to an unknown reference coordinate system. A calibration process identifies the unknown reference coordinate system and its relationship with respect to a known coordinate system. After the calibration the measurements of the IMU are relative to the known coordinate system. For example, the calibrated measurements can be an orientation relative to a predetermined orientation in the space, relative to a particular orientation of the sensor device at a specific time instance, relative to the orientation of the arm or hand of a user at a time instance, or relative to a reference orientation/pose of a skeleton model of the user.

At least some techniques disclosed herein allow the determination of calibration parameters of the measurements of the inertial measurement unit such that the calibrated measurements of the inertial measurement unit are relative to an known orientation, such as the orientation of the sensor device in which the inertial measurement unit is installed, the orientation of the arm or hand of a user to which the sensor device is attached, or the orientation of a skeleton model of the user in a reference pose. A stereo camera integrated in a head mount display (HMD) can be used to capture images of sensor modules on the user. Computer vision techniques and/or artificial neural network techniques can process the captured images identify one or more orientations that can be used to calibrate the measurements of the inertial measurement units in the sensor modules.

In general, the kinematics of a user can be modeled using a skeleton model having a set of rigid parts/portions connected by joints. For example, the head, the torso, the left and right upper arms, the left and right forearms, the palms, phalange bones of fingers, metacarpal bones of thumbs, upper legs, lower legs, and feet can be considered as rigid parts that are connected via various joints, such as the neck, shoulders, elbows, wrist, and finger joints.

The movements of the parts in the skeleton model of a user can be controlled by the movements of the corresponding portions of the user tracked using sensor modules. The sensor modules can determine the orientations of the portions of the user, such as the hands, arms, and head of the user. The measured orientations of the corresponding parts of the user determine the orientations of the parts of the skeleton model, such as hands and arms. The relative positions and/or orientations of the rigid parts collectively represent the pose of the user and/or the skeleton model. The skeleton model of the user can be used to control the presentation of an avatar of the user, to identify the gesture inputs of the user, and/or to make a virtual realty or augmented reality presentation of the user.

FIG. 1 illustrates a system to track user movements according to one embodiment.

FIG. 1 illustrates various parts of a user, such as the torso (101) of the user, the head (107) of the user, the upper arms (103 and 105) of the user, the forearms (112 and 114) of the user, and the hands (106 and 108) of the user.

In an application illustrated in FIG. 1, the hands (106 and 108) of the user are considered rigid parts movable around the wrists of the user. In other applications, the palms and finger bones of the user can be further tracked for their movements relative to finger joints (e.g., to determine the hand gestures of the user made using relative positions among fingers of a hand and the palm of the hand).

In FIG. 1, the user wears several sensor modules/devices (111, 113, 115, 117 and 119) that track the orientations of parts of the user that are considered, or recognized as, rigid in an application.

In an application illustrated in FIG. 1, rigid parts of the user are movable relative to the torso (101) of the user and relative to each other. Examples of the rigid parts include the head (107), the upper arms (103 and 105), the forearms (112 and 114), and the hands (106 and 108). The joints, such as neck, shoulder, elbow, and/or wrist, connect the rigid parts of the user to form one or more kinematic chains. The kinematic chains can be modeled in a computing device (141) to control the application.

To track the relative positions/orientations of rigid parts in a kinematic chain that connects the rigid parts via one or more joints, a tracking device can be attached to each individual rigid part in the kinematic chain to measure its orientation.

In general, the position and/or orientation of a rigid part in a reference system (100) can be tracked using one of many systems known in the field. Some of the systems may use one or more cameras to take images of a rigid part marked using optical markers and analyze the images to compute the position and/or orientation of the part. Some of the systems may track the rigid part based on signals transmitted from, or received at, a tracking device attached to the rigid part, such as radio frequency signals, infrared signals, ultrasound signals. The signals may correspond to signals received in the tracking device, and/or signals emitted from the tracking device. Some of the systems may use inertial measurement units (IMUs) to track the position and/or orientation of the tracking device.

In FIG. 1, the sensor devices (111, 113, 115, 117 and 119) are used to track some of the rigid parts (e.g., 107, 103, 105, 106, 108) in the one or more kinematic chains, but sensor devices are omitted from other rigid parts (101, 112, 114) in the one or more kinematic chains to reduce the number of sensor devices used and/or to improve user experience for wearing the reduced number of sensor devices.

The computing device (141) can have a prediction model (141) trained to generate predicted measurements of parts (101, 112, 114, 107, 103, 105, 106, and/or 108) of the user based on the measurements of the sensor devices (111, 113, 115, 117 and 119).

For example, the prediction model (141) can be implemented using an artificial neural network (ANN) in the computing device (141) to predict the measurements of the orientations of the rigid parts (101, 112, 114) that have omitted sensor devices, based on the measurements of the orientations rigid parts (107, 103, 105, 106, 108) that have the attached sensor devices (111, 113, 115, 117 and 119).

Further, the artificial neural network can be trained to predict the measurements of the orientations of the rigid parts (107, 103, 105, 106, 108) that would be measured by another system (e.g., an optical tracking system), based on the measurement of the attached sensor devices (111, 113, 115, 117 and 119) that measure orientations using a different technique (e.g., IMUs).

The sensor devices (111, 113, 115, 117, 119) communicate their movement measurements to the computing device (141), which computes or predicts the orientation of the rigid parts (107, 103, 105, 106, 108, 101, 112, 114) by applying the measurements obtained from the attached sensor devices (111, 113, 115, 117 and 119) as inputs to an artificial neural network trained in a way as further discussed below.

In some implementations, each of the sensor devices (111, 113, 115, 117 and 119) communicates its measurements directly to the computing device (141) in a way independent from the operations of other sensor devices.

Alternative, one of the sensor devices (111, 113, 115, 117 and 119) may function as a base unit that receives measurements from one or more other sensor devices and transmit the bundled and/or combined measurements to the computing device (141). In some instances, the artificial neural network is implemented in the base unit and used to generate the predicted measurements that are communicated to the computing device (141).

Preferably, wireless connections made via a personal area wireless network (e.g., Bluetooth connections), or a local area wireless network (e.g., Wi-Fi connections) are used to facilitate the communication from the sensor devices (111, 113, 115, 117 and 119) to the computing device (141).

Alternatively, wired connections can be used to facilitate the communication among some of the sensor devices (111, 113, 115, 117 and 119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141).

The hand (106), the forearm (114), and the upper arm (105) can be considered a kinematic chain, for which an artificial neural network can be trained to predict the orientation measurements generated by an optical track system, based on the sensor inputs from the sensor devices (117 and 115) that are attached to the hand (106) and the upper arm (105), without a corresponding device on the forearm (114).

Optionally or in combination, the hand module (e.g., 117) may combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111). The head module (111) may further determine the orientation of the torso (101) from the orientation of the arm modules (115 and 113) and/or the orientation of the head module (111), using an artificial neural network trained for a corresponding kinematic chain, which includes the upper arms (103 and 105), the torso (101), and/or the head (107).

For the determination of the orientation of the torso (101), the hand modules (117 and 119) are optional in the system illustrated in FIG. 1.

Further, in some instances the head module (111) is not used in the tracking of the orientation of the torso (101) of the user.

Typically, the measurements of the sensor devices (111, 113, 115, 117 and 119) are calibrated for alignment with a common reference system, such as the coordinate system (100).

For example, the coordinate system (100) can correspond to the orientation of the arms and body of the user in a standardized pose illustrated in FIG. 1. When in the pose of FIG. 1, the arms of the user point in the directions that are parallel to the Y axis; the front facing direction of the user is parallel to the X axis; and the legs, the torso (101) to the head (107) are in the direction that is parallel to the Z axis.

After the calibration, the hands, arms (105, 103), the head (107) and the torso (101) of the user may move relative to each other and relative to the coordinate system (100). The measurements of the sensor devices (111, 113, 115, 117 and 119) provide orientations of the hands (106 and 108), the upper arms (105, 103), and the head (107) of the user relative to the coordinate system (100). The computing device (141) computes, estimates, or predicts the current orientation of the torso (101) and/or the forearms (112 and 114) from the current orientations of the upper arms (105, 103), the current orientation the head (107) of the user, and/or the current orientation of the hands (106 and 108) of the user and their orientation history using the prediction model (116).

Some techniques of using an artificial neural network to predict the movements of certain parts in a skeleton model that are not separately tracked using dedicated sensor devices can be found in U.S. patent application Ser. No. 15/996,389, filed Jun. 1, 2018 and entitled "Motion Predictions of Overlapping Kinematic Chains of a Skeleton Model used to Control a Computer System," and U.S. patent application Ser. No. 15/973,137, filed May 7, 2018 and entitled "tracking User Movements to Control a Skeleton Model in a Computer System," the entire disclosures of which applications are hereby incorporated herein by reference.

Optionally or in combination, the computing device (141) may further compute the orientations of the forearms from the orientations of the hands (106 and 108) and upper arms (105 and 103), e.g., using a technique disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

Figure 2:
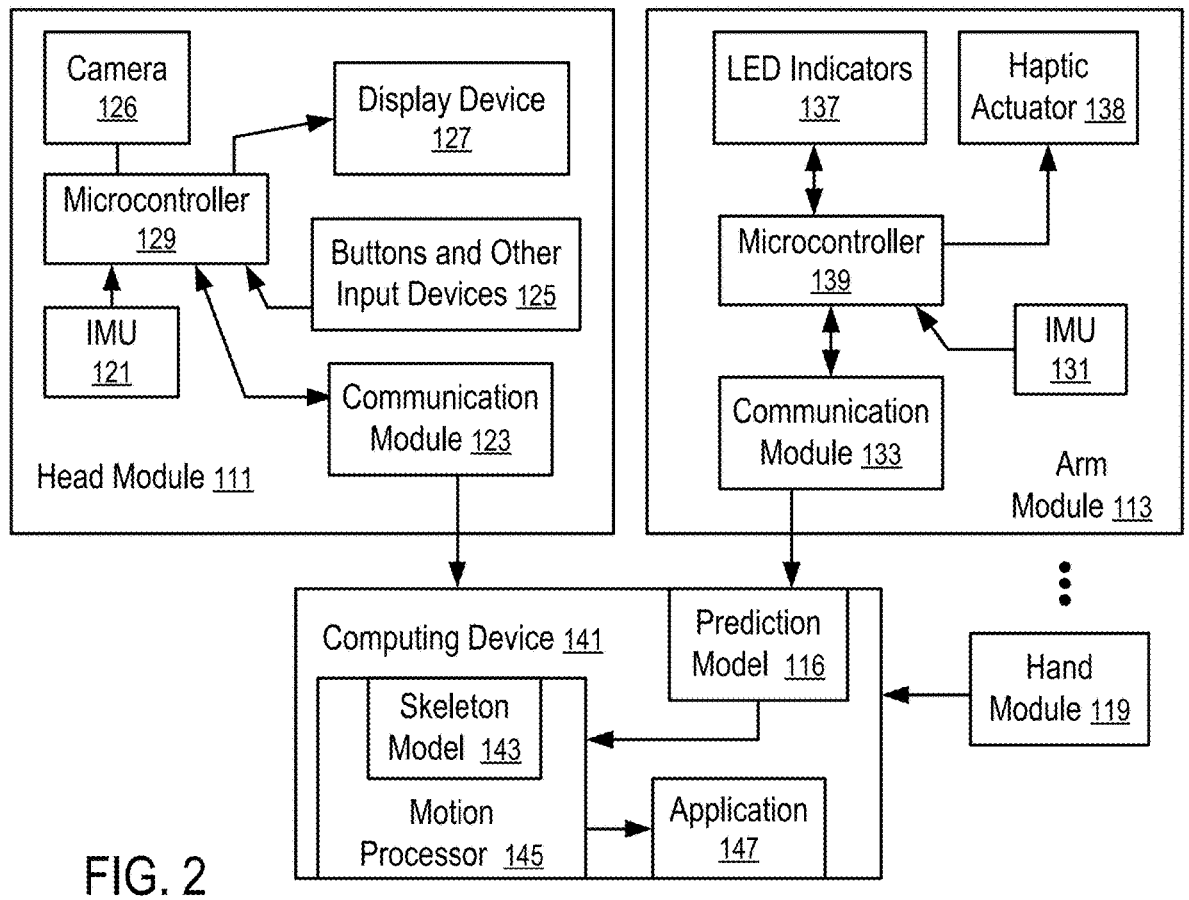
FIG. 2 illustrates a system to control computer operations according to one embodiment.

FIG. 2 illustrates a system to control computer operations according to one embodiment. For example, the system of FIG. 2 can be implemented via attaching the arm modules (115 and 113) to the upper arms (105 and 103) respectively, the head module (111) to the head (107) and/or hand modules (117 and 119), in a way illustrated in FIG. 1.

In FIG. 2, the head module (111) and the arm module (113) have micro-electromechanical system (MEMS) inertial measurement units (IMUs) (121 and 131) that measure motion parameters and determine orientations of the head (107) and the upper arm (103).

Similarly, the hand modules (117 and 119) can also have IMUs. In some applications, the hand modules (117 and 119) measure the orientation of the hands (106 and 108) and the movements of fingers are not separately tracked. In other applications, the hand modules (117 and 119) have separate IMUs for the measurement of the orientations of the palms of the hands (106 and 108), as well as the orientations of at least some phalange bones of at least some fingers on the hands (106 and 108). Examples of hand modules can be found in U.S. patent application Ser. No. 15/792,255, filed Oct. 24, 2017 and entitled "Tracking Finger Movements to Generate Inputs for Computer Systems," the entire disclosure of which is hereby incorporated herein by reference.

Each of the IMUs (131 and 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) can have a prediction model (116) and a motion processor (145). The measurements of the IMUs (e.g., 131, 121) from the head module (111), arm modules (e.g., 113 and 115), and/or hand modules (e.g., 117 and 119) are used in the prediction module (116) to generate predicted measurements of at least some of the parts that do not have attached sensor modules, such as the torso (101), and forearms (112 and 114). The predicted measurements and/or the measurements of the IMUs (e.g., 131, 121) are used in the motion processor (145).

Figure 3:
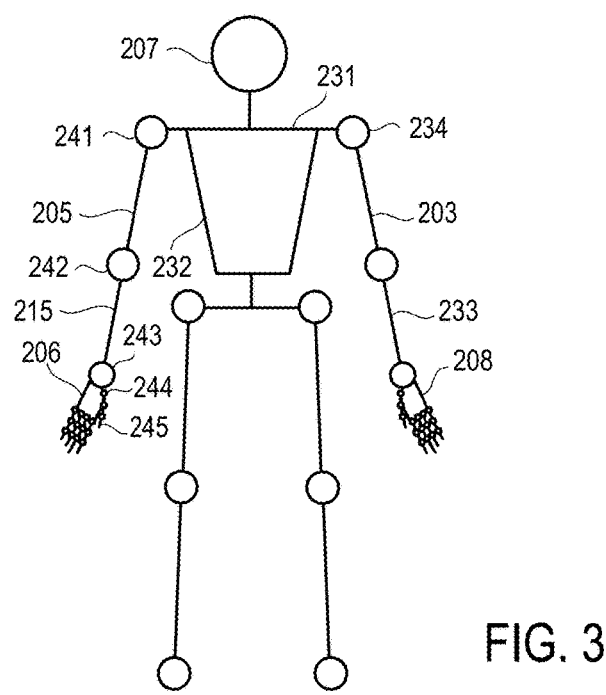
FIG. 3 illustrates a skeleton model that can be controlled by tracking user movements according to one embodiment.

The motion processor (145) has a skeleton model (143) of the user (e.g., illustrated FIG. 3). The motion processor (145) controls the movements of the parts of the skeleton model (143) according to the movements/orientations of the corresponding parts of the user. For example, the orientations of the hands (106 and 108), the forearms (112 and 114), the upper arms (103 and 105), the torso (101), the head (107), as measured by the IMUs of the hand modules (117 and 119), the arm modules (113 and 115), the head module (111) sensor modules and/or predicted by the prediction model (116) based on the IMU measurements are used to set the orientations of the corresponding parts of the skeleton model (143).

Since the torso (101) does not have a separately attached sensor module, the movements/orientation of the torso (101) can be predicted using the prediction model (116) using the sensor measurements from sensor modules on a kinematic chain that includes the torso (101). For example, the prediction model (116) can be trained with the motion pattern of a kinematic chain that includes the head (107), the torso (101), and the upper arms (103 and 105) and can be used to predict the orientation of the torso (101) based on the motion history of the head (107), the torso (101), and the upper arms (103 and 105) and the current orientations of the head (107), and the upper arms (103 and 105).

Similarly, since a forearm (112 or 114) does not have a separately attached sensor module, the movements/orientation of the forearm (112 or 114) can be predicted using the prediction model (116) using the sensor measurements from sensor modules on a kinematic chain that includes the forearm (112 or 114). For example, the prediction model (116) can be trained with the motion pattern of a kinematic chain that includes the hand (106), the forearm (114), and the upper arm (105) and can be used to predict the orientation of the forearm (114) based on the motion history of the hand (106), the forearm (114), the upper arm (105) and the current orientations of the hand (106), and the upper arm (105).

The skeleton model (143) is controlled by the motion processor (145) to generate inputs for an application (147) running in the computing device (141). For example, the skeleton model (143) can be used to control the movement of an avatar/model of the arms (112, 114, 105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera (126), etc.

In some instances, a stereo camera (126) is used to capture stereo images of the sensor devices (113, 115, 117, 119) to calibrate their measurements relative to a common coordinate system, such as the coordinate system (100) defined in connection with a reference pose illustrated in FIG. 1. Further, the LED indicators (e.g., 137) of a sensor module (e.g., 113) can be turned on during the time of capturing the stereo images such that the orientation and/or identity of the sensor module (e.g., 113) can be determined from the locations and/or patterns of the LED indicators.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

When a hand module (e.g., 117 or 119) tracks the orientations of the palm and a selected set of phalange bones, the motion pattern of a kinematic chain of the hand captured in the predictive mode (116) can be used in the prediction model (116) to predict the orientations of other phalange bones that do not wear sensor devices.

FIG. 2 shows a hand module (119) and an arm module (113) as examples. In general, an application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms (112 and 114) of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicators (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model that can be controlled by tracking user movements according to one embodiment. For example, the skeleton model of FIG. 3 can be used in the motion processor (145) of FIG. 2.

The skeleton model illustrated in FIG. 3 includes a torso (232) and left and right upper arms (203 and 205) that can move relative to the torso (232) via the shoulder joints (234 and 241). The skeleton model may further include the forearms (215 and 233), hands (206 and 208), neck, head (207), legs and feet. In some instances, a hand (206) includes a palm connected to phalange bones (e.g., 245) of fingers, and metacarpal bones of thumbs via joints (e.g., 244).

The positions/orientations of the rigid parts of the skeleton model illustrated in FIG. 3 are controlled by the measured orientations of the corresponding parts of the user illustrated in FIG. 1. For example, the orientation of the head (207) of the skeleton model is configured according to the orientation of the head (107) of the user as measured using the head module (111); the orientation of the upper arm (205) of the skeleton model is configured according to the orientation of the upper arm (105) of the user as measured using the arm module (115); and the orientation of the hand (206) of the skeleton model is configured according to the orientation of the hand (106) of the user as measured using the hand module (117); etc.

For example, the tracking system as illustrated in FIG. 2 measures the orientations of the modules (111, 113, ..., 119) using IMUs (e.g., 111, 113, ...). The inertial-based sensors offer good user experiences, have less restrictions on the use of the sensors, and can be implemented in a computational efficient way. However, the inertial-based sensors may be less accurate than certain tracking methods in some situations, and can have drift errors and/or accumulated errors through time integration. Drift errors and/or accumulated errors can be considered as the change of the reference orientation used for the measurement from a known reference orientation to an unknown reference orientation. An update calibration can remove the drift errors and/or accumulated errors An optical tracking system can use one or more cameras (e.g., 126) to track the positions and/or orientations of optical markers (e.g., LED indicators (137)) that are in the fields of view of the cameras. When the optical markers are within the fields of view of the cameras, the images captured by the cameras can be used to compute the positions and/or orientations of optical markers and thus the orientations of parts that are marked using the optical markers. However, the optical tracking system may not be as user friendly as the inertial-based tracking system and can be more expensive to deploy. Further, when an optical marker is out of the fields of view of cameras, the positions and/or orientations of optical marker cannot be determined by the optical tracking system.

An artificial neural network of the prediction model (116) can be trained to predict the measurements produced by the optical tracking system based on the measurements produced by the inertial-based tracking system. Thus, the drift errors and/or accumulated errors in inertial-based measurements can be reduced and/or suppressed, which reduces the need for re-calibration of the inertial-based tracking system. Further details on the use of the prediction model (116) can be found in U.S. patent application Ser. No. 15/973,137, filed May 7, 2018 and entitled "tracking User Movements to Control a Skeleton Model in a Computer System," the entire disclosure of which application is hereby incorporated herein by reference.

Further, the orientations determined using images captured by the camera (126) can be used to calibrate the measurements of the sensor devices (111, 113, 115, 117, 119) relative to a common coordinate system, such as the coordinate system (100) defined using a standardized reference pose illustrated in FIG. 1, as further discussed below.

FIGS. 4-12 illustrate user poses that can be captured using a camera (126) of a head mounted display (127) to calibrate orientation measurements of sensor devices (113, 115, 117, 119).

It is advantageous to use the user poses illustrated in FIGS. 4-12 to perform calibration. The user poses illustrated in FIGS. 4-12 do not require the user to be in the exact position as illustrated in FIG. 1, but allows the achieve calibration results similar to calibration using the user pose of FIG. 1. The user poses illustrated in FIGS. 4-12 can be used to calibrate the individual sensor modules (113, 115, 117, 119) separately. Further, the user poses illustrated in FIGS. 4-12 allows automatic calibration when images of user poses similar to those illustrated in FIGS. 4-12 are captured in real time usage of an application, such as a virtual reality and/or augmented/mixed reality application.

Figure 4:
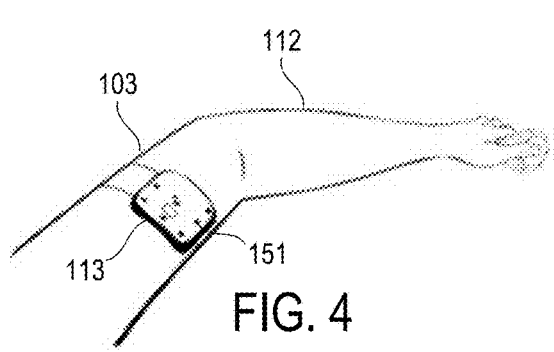
FIGS. 4-12 illustrate user poses that can be captured using a camera of a head mounted display to calibrate orientation measurements of sensor devices.
Figure 5:
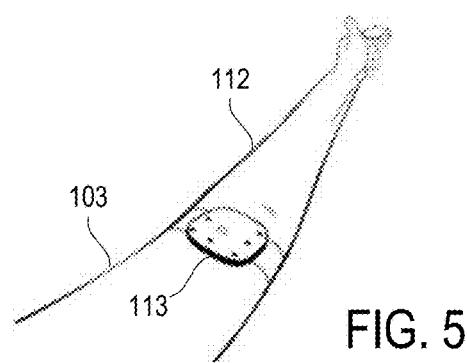

For example, when the left arm (103, 112) of the user is moved into the field of view of the camera (126), the camera (126) can take a stereo image of the left arm (103) wearing the sensor module (113) in a way illustrated in FIGS. 4 and 5. The computing device (141) can predict that the movement of the left arm (103, 112) into the field of view of the camera (126) based on the current measurements of the sensor module (113), automatically instruct the camera (126) to take the stereo image, and then use the stereo image to perform calibration to improve the measurements of the sensor module (113).

Preferably, when the camera (126) is taking the stereo image for calibration, the sensor module (113) is instructed to turn on its LED indicators (e.g., 151). The set of LED indicators (e.g., 151) captured in the stereo image can be detected to compute their locations in a three-dimensional space. For example, the detection of the locations of the LED indicators (e.g., 151) in the stereo image can be performed using a convolutional neural network (CNN). From the locations of the LED indicators (e.g., 151), the computing device (141) (or the head module (111) or another device) can compute the orientation of the sensor device (113).

When the camera (126) is taking the stereo image for calibration, the sensor module (113) generates an orientation measurement. By comparing the orientation measurement generated by the sensor module (113) and the orientation of the sensor device (113) determined from the stereo image, a rotational transformation can be determined to rotate the orientation measurement generated by the sensor module (113) to the orientation of the sensor module (113). Such a rotational transformation can be used as calibration parameter to align the measurements generated by the sensor module with the orientation of the sensor module (113).

Further, from the image of the left arm (103, 112) of the user, a trained convolutional neural network (CNN) can predict the orientations of the left arm (103, 112) of the user. From comparing the orientation of the sensor module (113) and the orientation of the left arm (103) wearing the sensor module (113), a rotational transformation can be determined to rotate the orientation of the sensor module (113) to the orientation of the left arm (103). Such a rotational transformation can be used as calibration parameters to align the measurements generated by the sensor module with the orientation of the left arm (103).

Figure 6:
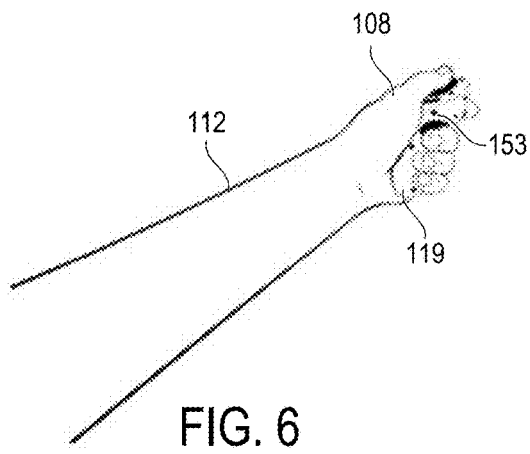
Figure 7:
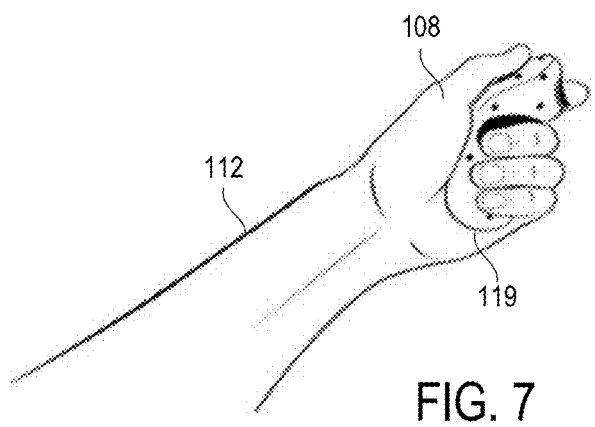
Figure 8:
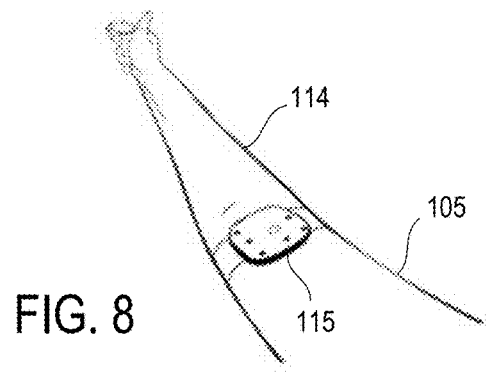
Figure 9:
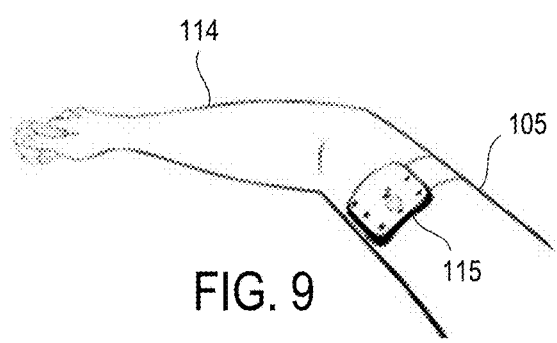
Figure 10:
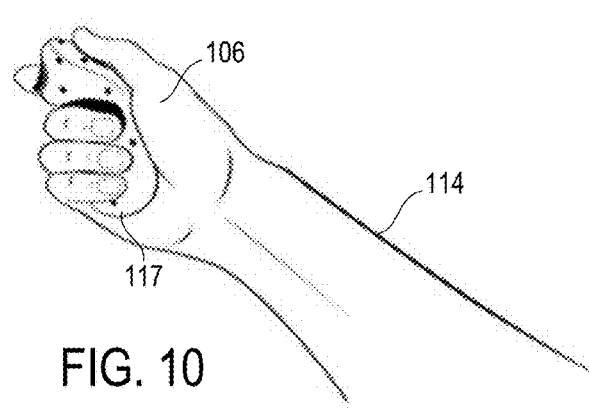
Figure 11:
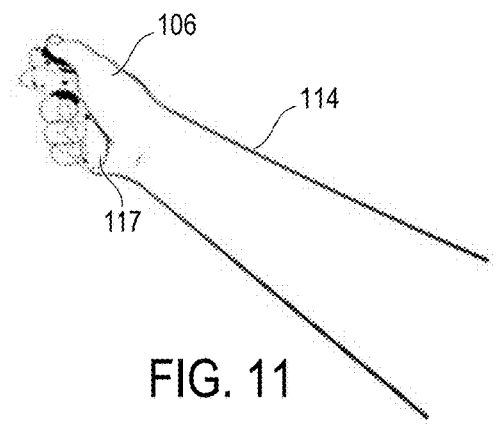

Similarly, images of an arm module (115) on the right arm (105, 114) can be captured as illustrated in FIGS. 8 and 9 for the calibration of the arm module (115); images of a hand module (119) on the left hand (108) can be captured as illustrated in FIGS. 6 and 7 for the calibration of the hand module (119); and images of a hand module (117) on the right hand (106) can be captured as illustrated in FIGS. 10 and 11 for the calibration of the hand module (117).

When the calibrated orientation measurement is consistent with the orientation determined from the stereo image, the calibrated orientation measurement is relative to the same reference system used for the determination of the orientation determined from the stereo image, which may be different from the common coordinate system (100) defined relative to the user in the pose illustrated in FIG. 1.

Figure 12:
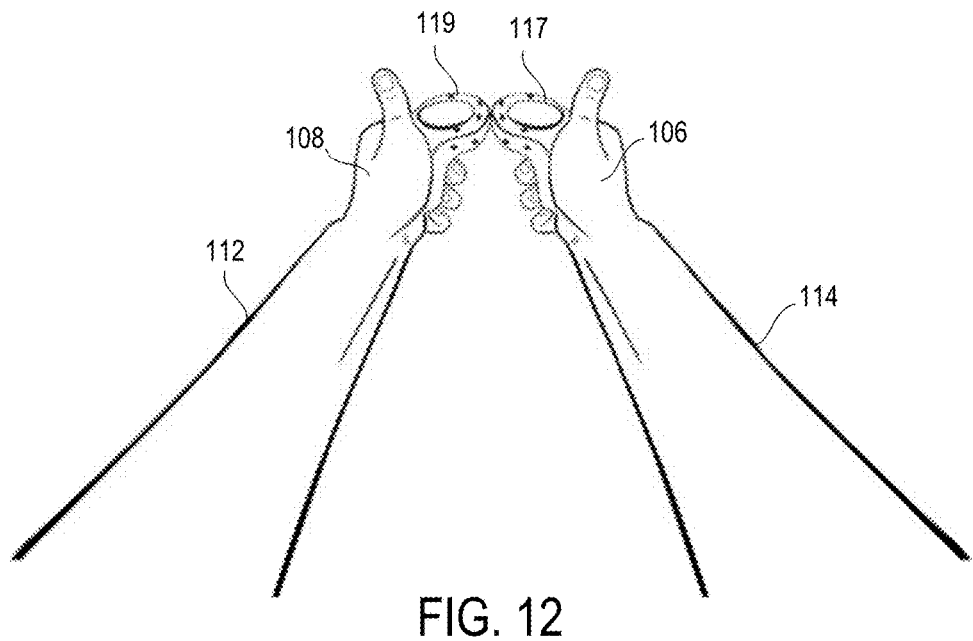

An image illustrated in FIG. 12 captures both hands (106 and 108) of the user holding the hand modules (117 and 119), which allows the system to center of the calibrated orientations with respect to a common front direction along the X axis illustrated in FIG. 1.

In general, a user does not have to hold an exact pose to take images illustrated in FIGS. 4-12 for calibration. The orientations of the sensor devices (113, 115, 117, and 119) and/or the orientations of the portions (103, 105, 106 and 108) determined from stereo images generated by the camera (126) allow accurate calibration relative to the body of the user and thus the common coordinate system (100).

In general, from the images of a sensor module (e.g., 113) captured using the camera (126), the current orientation of the sensor module (e.g., 113) as captured in the images relative to a reference orientation of the camera (126) (Osc) can be computed. In general, the camera (126) may move and/or rotate between times of capturing different images; and the measurement of the IMU (121) in the head module (111) can be used to compensate the rotation of the camera (126) and compute or convert the orientation of the sensor module (e.g., 113) computed from the stereo image relative to a consistent reference orientation of the camera (126) that is fixed in the space.

From the images of the part of the user (e.g., arm (103)) wearing the sensor module (e.g., 113), the current orientation of the part of the user (e.g., arm (103)) relative to the reference orientation of the camera (126) (Opc) can be computed.

The measurement generated by the IMU (e.g., 131) of the sensor module provides the current orientation of the sensor module (e.g., 113), at the time of capturing the stereo image, relative to a reference orientation of the sensor module (e.g., 113) (Osr).

These orientations (e.g., Osc, Opc, and Osr) are related to each other via calibration rotations. One example of calibration rotations is a reference rotation (Rcr) between the reference orientation of the camera (126) and the reference orientation of the sensor module (e.g., 113). Another example of calibration rotations is a wearing orientation (Rps) between the current orientation of the part of the user (e.g., arm (103)) and the current orientation of the sensor module (e.g., 113). Within a period of time (e.g., less than a threshold of time duration), the calibration rotations (e.g., Rcr and Rps) can be considered as constants. The calibration rotations/parameters can be used to convert one measurement to another.

For example, the current orientation of the part of the user (e.g., arm (103)) relative to the reference orientation of the camera (126) (Opc) can be converted to, or from, the current orientation of the sensor module (e.g., 113) as captured in the images relative to a reference orientation of the camera (126) (Osc) by applying rotations according to the reference rotation (Rcr) and the wearing orientation (Rps). By capturing images of the part of the user (e.g., arm (103)) at two different poses and recording the IMU sensor measurements at the two poses, the reference rotation (Rcr) and the wearing orientation (Rps) can be determined from the relation among the current orientation of the part of the user (e.g., arm (103)) relative to the reference orientation of the camera (126) (Opc), the current orientation of the sensor module (e.g., 113) relative to the reference orientation of the camera (126) (Osc), the reference rotation (Rcr), and the wearing orientation (Rps).

For example, the current orientation of the sensor module (e.g., 113) as relative to the reference orientation of the camera (126) (Osc) can be converted to, or from, the current orientation of the sensor module (e.g., 113) relative to the reference orientation of the sensor module (e.g., 113) (Osr) by applying a rotation according to the reference rotation (Rcr). Inversely, the reference rotation (Rcr) can be determined from capturing images of the sensor module (e.g., 113) and recording the orientation of the sensor module (e.g., 113) measured relative to the reference orientation of the sensor module (e.g., 113), using the relation among the current orientation of the sensor module (e.g., 113) as relative to the reference orientation of the camera (126) (Osc), the current orientation of the sensor module (e.g., 113) relative to the reference orientation of the sensor module (e.g., 113) (Osr), and the reference rotation (Rcr).

For example, the current orientation of the part of the user (e.g., arm (103)) relative to the reference orientation of the camera (126) (Opc) can be converted to, or from, the current orientation of the sensor module (e.g., 113) relative to the reference orientation of the camera (126) (Osc) by applying a rotation according to the wearing orientation (Rps). Inversely, the wearing orientation (Rps) can be computed from the relation among the current orientation of the part of the user (e.g., arm (103)) relative to the reference orientation of the camera (126) (Opc), the current orientation of the sensor module (e.g., 113) relative to the reference orientation of the camera (126) (Osc), and the wearing orientation (Rps), by capturing images of the sensor module (e.g., 113) worn on the part of the user (e.g., arm (103)).

After the sensor devices (e.g., 113, 115, 117 and 119) are individually calibrated with respect to the reference orientation of the camera (126), an image as captured using a user pose illustrated in FIG. 12 can be used to calibration the reference orientation of the camera (126) relative to the skeleton of the user, which allows the sensor devices (e.g., 113, 115, 117 and 119) to be further calibrated to the skeleton of the user (e.g., common coordinate system (100) illustrated in FIG. 1).

Figure 13:
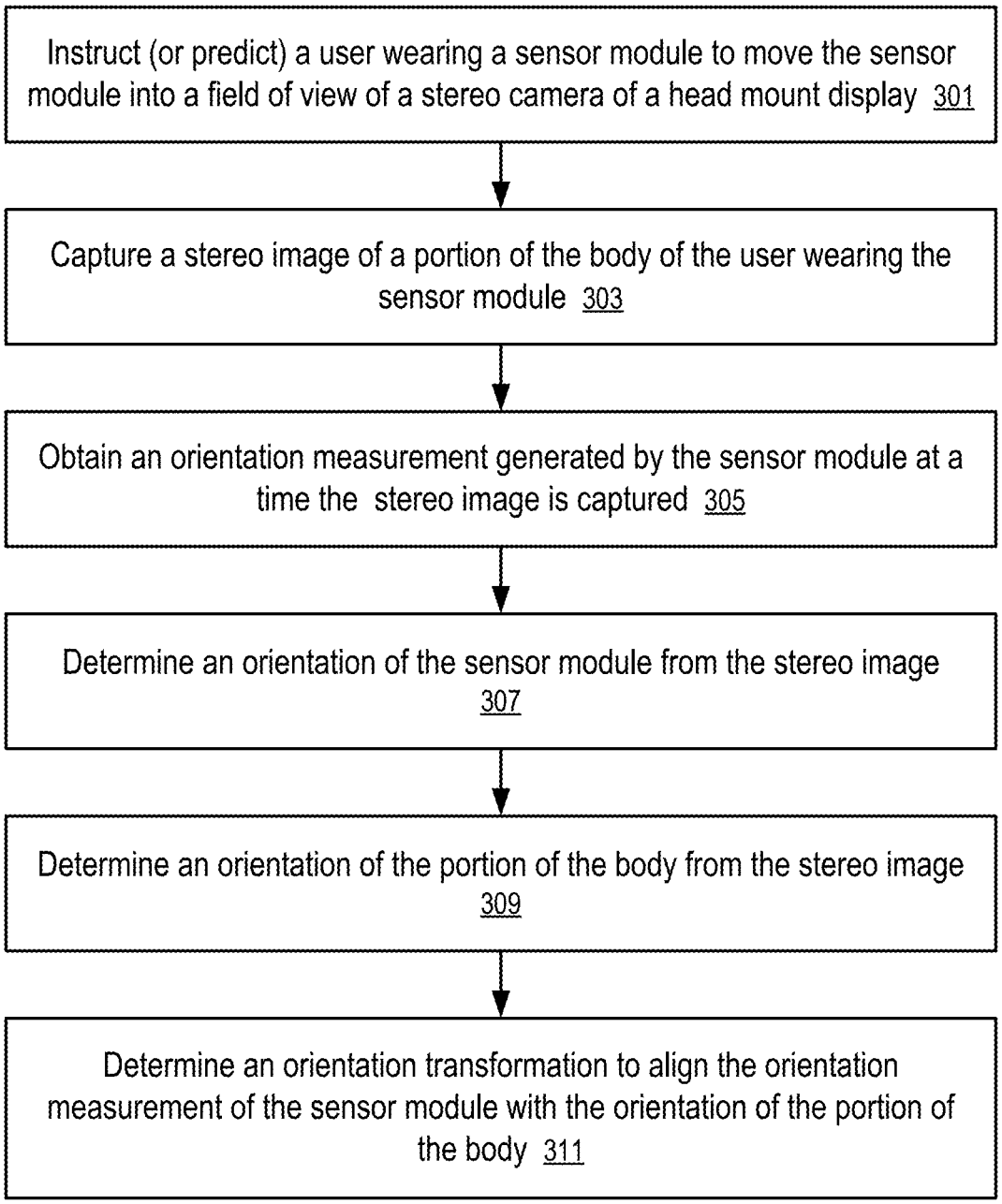
FIG. 13 shows a method to calibrate a sensor module relative to a portion of a user.

FIG. 13 shows a method to calibrate a sensor module relative to a portion of a user. For example, the method of FIG. 13 can be used in a system of FIG. 2 and/or FIG. 1 to control a skeleton model of FIG. 3 using images captured using at least some of the poses illustrated in FIGS. 4-12.

In FIG. 13, the method includes: instructing (301) (or predicting) a user wearing a sensor module (e.g., 113, 115, 117 or 119) to move the sensor module into a field of view of a stereo camera (126) of a head mount display; capturing (303) a stereo image of a portion of the body of the user wearing the sensor module; obtaining (305) an orientation measurement generated by the sensor module at a time the stereo image is captured; determining (307) an orientation of the sensor module from the stereo image; determining (309) an orientation of the portion of the body from the stereo image; and determining (311) an orientation transformation to align the orientation measurement of the sensor module with the orientation of the portion of the body;

For example, the prediction of the user moving the sensor module into the field of view of a stereo camera (126) can be made using the current measurements generated by the sensor modules controlling the skeleton model of FIG. 3. The prediction allows the computing device (141) to automatically start the calibration operation by capturing the stereo image. The computing device (141) can further analyze the stereo image to confirm that the stereo image is suitable to support the calibration operation (e.g., having the sensor module captured in the stereo image). Alternatively, or in combination, the prediction (301) can be based on an explicit instruction provided to the user and the anticipation that the user will follow the instruction to make the pose.

For example, the orientation transformation can be a wearing orientation that identifies a rotation between the orientation of the portion of the body wearing the sensor module and the orientation of the sensor module. The wearing orientation can be determined from the orientation of the portion of the body and the orientation of the sensor module, both determined from the stereo image captured at the position.

For example, the orientation transformation can be a reference rotation between a reference orientation for generating the orientation measurements by the sensor module and the reference orientation for determining the orientations of the portion of the body from stereo images. After the wearing orientation is calculated or known (or assumed to be known, e.g., when wearing of the sensor device is in accordance with a predetermined manner), the reference rotation can be determined from the orientation measurement generated by the sensor module while being in the position and the orientation of the portion of the body (or the sensor module) determined from the corresponding stereo image at the corresponding position.

Figure 14:
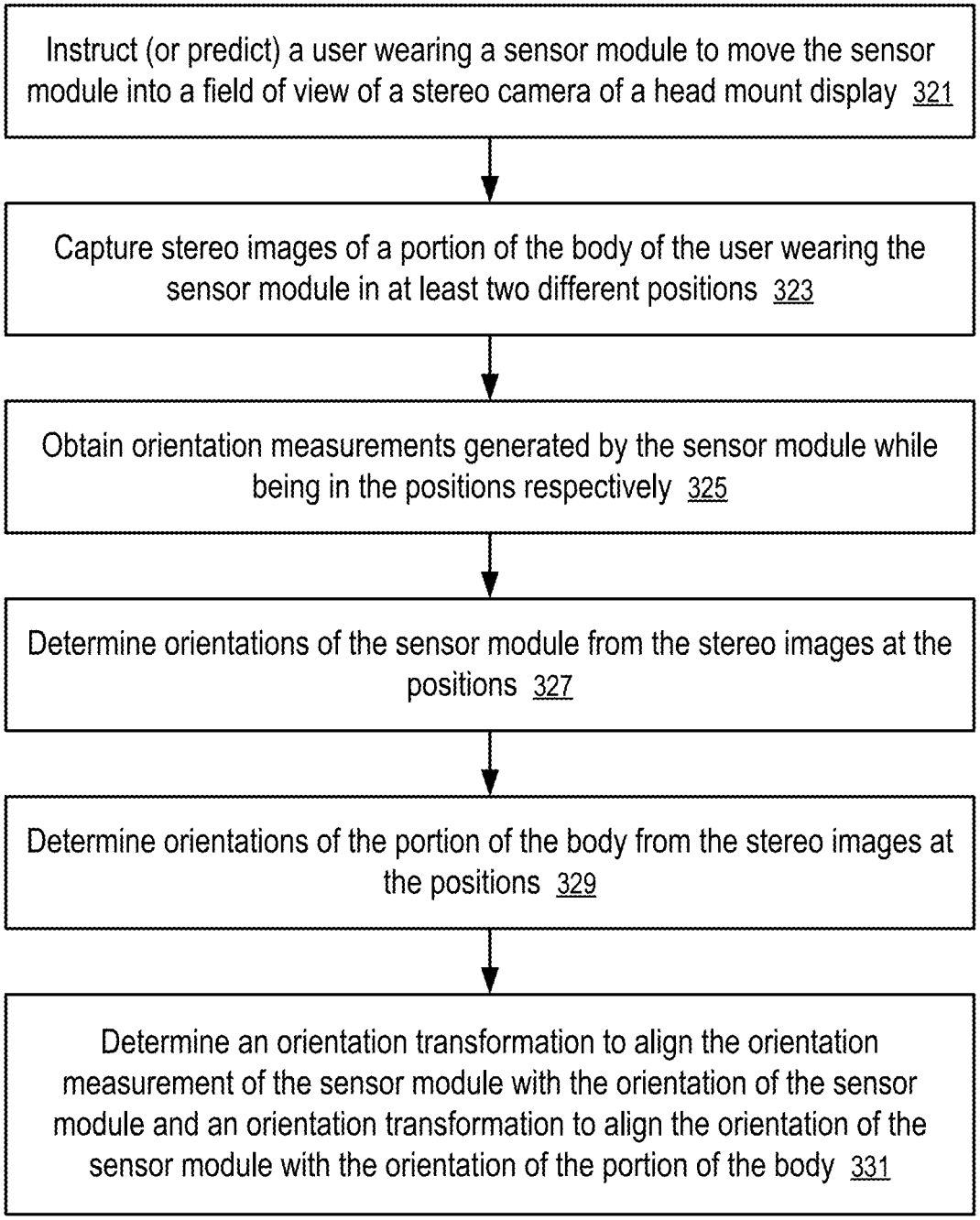
FIG. 14 shows another method to calibrate a sensor module relative to a portion of a user.

FIG. 14 shows another method to calibrate a sensor module relative to a portion of a user. For example, the method of FIG. 14 can be used in a system of FIG. 2 and/or FIG. 1 to control a skeleton model of FIG. 3 using images captured using at least some of the poses illustrated in FIGS. 4-12.

In FIG. 14, the method includes: instructing (321) (or predicting) a user wearing a sensor module (e.g., 113, 115, 117 or 119) to move the sensor module into a field of view of a stereo camera (126) of a head mount display (111); capturing (323) stereo images (e.g., illustrated in FIGS. 4-12) of a portion of the body of the user wearing the sensor module in at least two different positions (e.g., different poses as captured in the stereo images); obtaining (325) orientation measurements generated by the sensor module while being in the positions respectively; determining (327) orientations of the sensor module from the stereo images at the positions; determining (329) orientations of the portion of the body from the stereo images at the positions; and determining (331) an orientation transformation to align the orientation measurement of the sensor module with the orientation of the sensor module and an orientation transformation to align the orientation of the sensor module with the orientation of the portion of the body.

As discussed above in connection with FIG. 14, the prediction (321) can be made based on the current measurements of the sensor modules and/or explicit instructions provided to the user to make the poses.

For example, the orientation transformation can be a reference rotation between a reference orientation for generating the orientation measurements by the sensor module and the reference orientation for determining the orientations of the portion of the body from stereo images.

For example, the orientation transformation can be a wearing orientation between the orientation of the portion of the body wearing the sensor module and the orientation of the sensor module.

For example, the reference rotation and the wearing orientation can be determined from the orientation measurements generated by the sensor module while being in the positions respectively and the orientations of the portion of the body from the stereo images at the positions.

For example, the wearing orientation can be determined from the orientations of the portion of the body and the orientations of the sensor module, both determined from the stereo image at least one of the positions. When different wearing orientations are determined based on stereo images captured at different positions (poses), an average of the different wearing orientations can be used as a wearing orientation for calibration.

For example, when the wearing orientation is known (or assumed to be known, e.g., when wearing of the sensor device is in accordance with a predetermined manner), the reference rotation can be determined from the orientation measurement generated by the sensor module while being in one of the positions and the orientation of the portion of the body (or the sensor module) determined from the corresponding stereo image at the corresponding position. When different reference rotations are determined based on stereo images captured at different positions (poses), an average of the different reference rotations can be used at a reference rotation for calibration.

Figure 15:
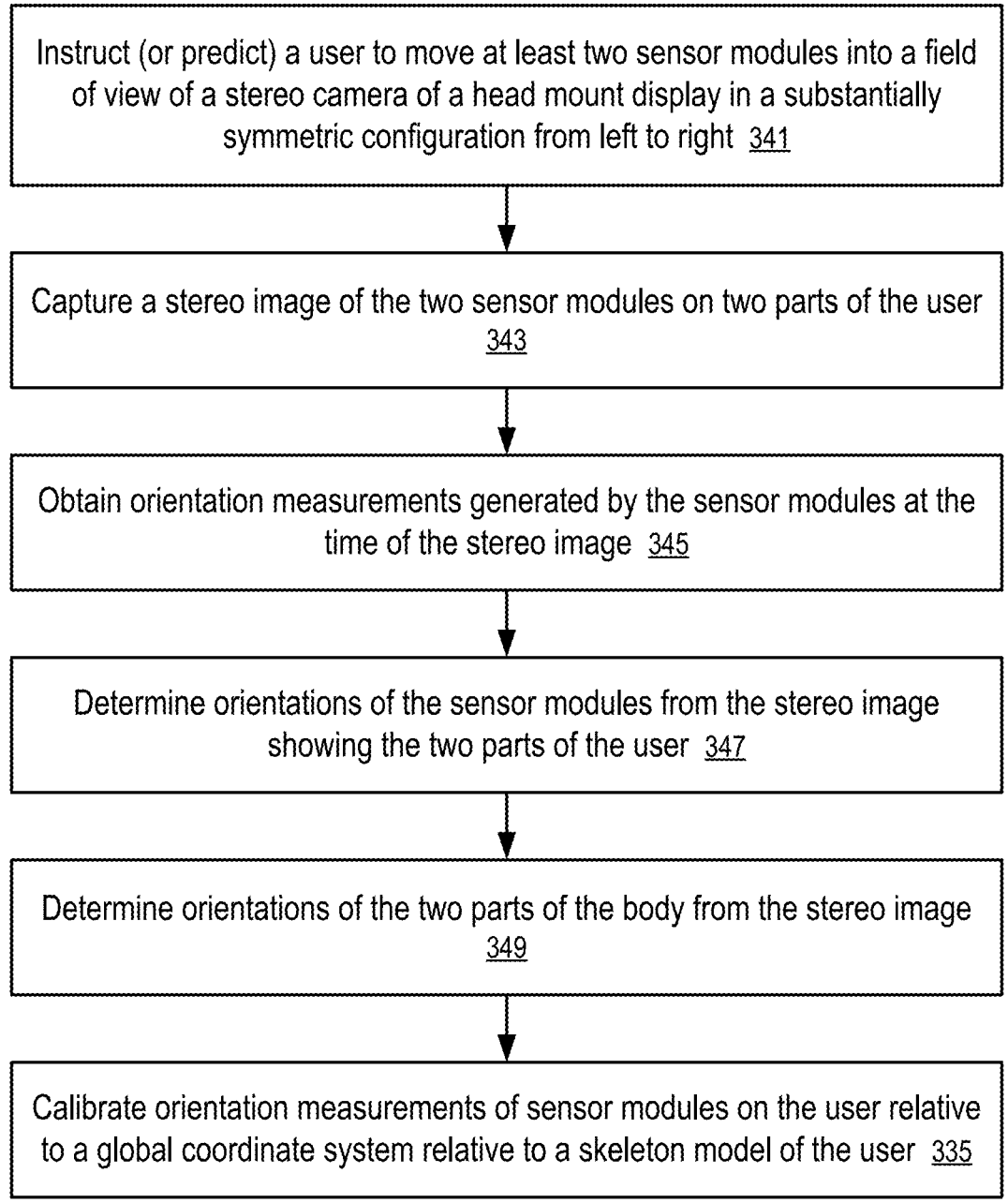
FIG. 15 shows a method to calibrate a set of sensor modules relative to a skeleton model of a user.

FIG. 15 shows a method to calibrate a set of sensor modules relative to a skeleton model of a user. For example, the method of FIG. 15 can be used in a system of FIG. 2 and/or FIG. 1 to control a skeleton model of FIG. 3 using images captured using at least some of the poses illustrated in FIG. 12.

The method of FIG. 15 includes: instructing (341) (or predicting) a user to move at least two sensor modules into a field of view of a stereo camera of a head mount display (111) in a substantially symmetric configuration from left to right; capturing (343) a stereo image of the two sensor modules on two parts of the user; obtaining (345) orientation measurements generated by the sensor modules at the time of the stereo image; determining (347) orientations of the sensor modules from the stereo image showing the two parts of the user; determining (349) orientations of the two parts of the body from the stereo image; and calibrating (335) orientation measurements of sensor modules on the user relative to a global coordinate system (100) relative to a skeleton model of the user (e.g., illustrated in FIG. 1 or 3).

As discussed above in connection with FIGS. 13 and 14, the prediction (341) can be made based on the current measurements of the sensor modules and/or an explicit instruction provided to the user to make the pose.

For example, the stereo image can be used to capture the configuration where the left and right forearms (112 and 114) are substantially symmetric from the left to the right, as illustrated in FIG. 12 to identify the front facing direction X, which allows the reference system of the camera to be calibrated against the orientation of the user pose illustrated in FIG. 1 or the skeleton model illustrated in FIG. 3.

The orientation measurements of the sensor modules at the time of the stereo image and the orientations of the sensor modules (and/or two parts of the user) determined from the stereo image can be used to determine orientation transformations of the sensor modules in a way similar to those discussed above in connection with the methods of FIGS. 13 and 14.

Figure 16:
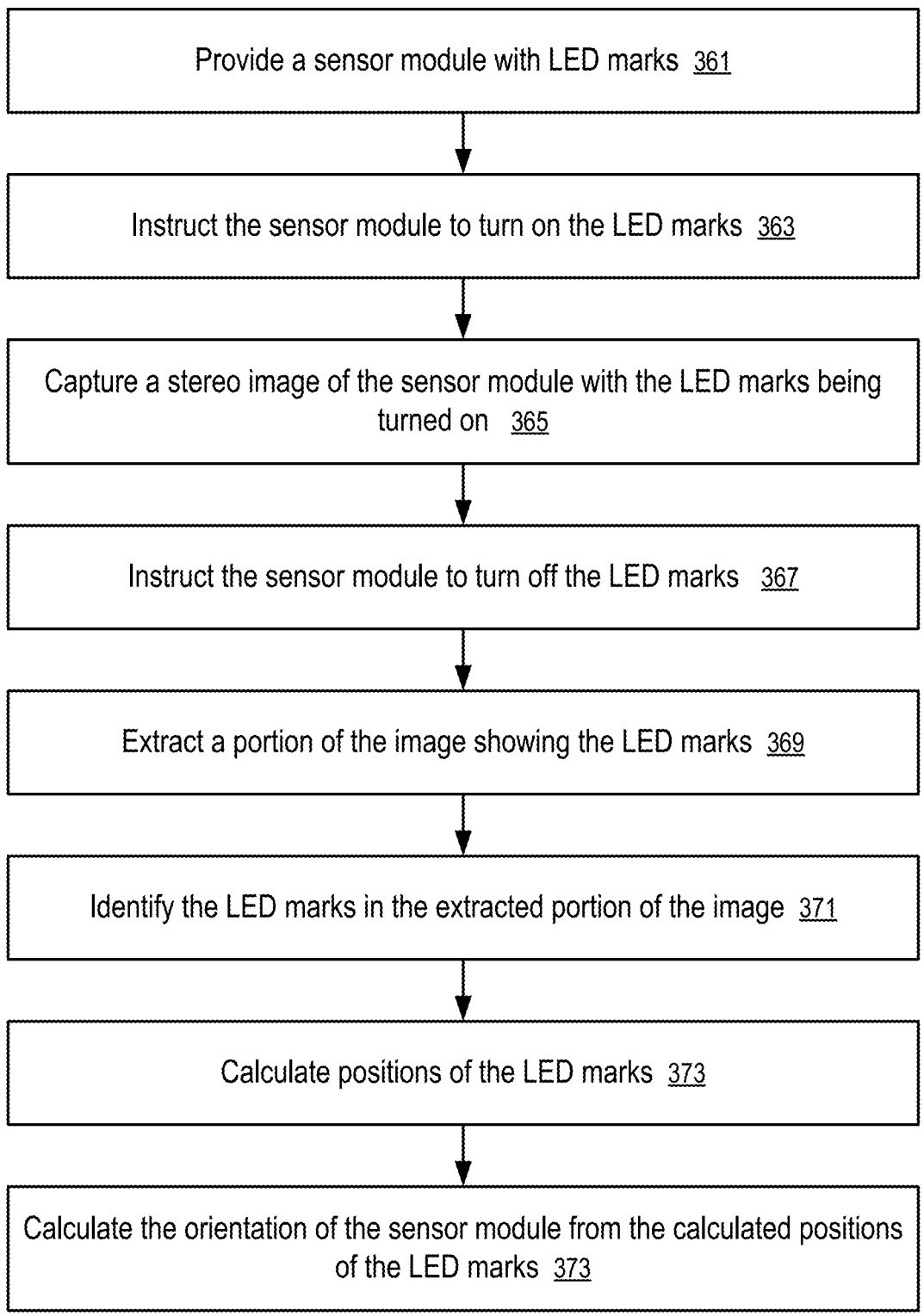
FIG. 16 shows a method to determine the orientation of a sensor module according to one embodiment.

FIG. 16 shows a method to determine the orientation of a sensor module according to one embodiment. For example, the method of FIG. 16 can be used in a system of FIG. 2 and/or FIG. 1 to control a skeleton model of FIG. 3 using images captured using at least some of the poses illustrated in FIGS. 4-12.

The method of FIG. 16 includes: providing (361) a sensor module with LED marks; instructing (363) the sensor module to turn on the LED marks (e.g., in response to a prediction that the user is to be in a pose suitable for calibration operation); capturing (365) a stereo image of the sensor module with the LED marks being turned on; instructing (367) the sensor module to turn off the LED marks; extracting (369) a portion of the image showing the LED marks; identifying (371) the LED marks in the extracted portion of the image; calculating (373) positions of the LED marks; and calculating (373) the orientation of the sensor module from the calculated positions of the LED marks.

The portion of the image showing the LED marks can be extracted using an artificial neural network (ANN); and the LED marks in the extracted portion of the image can be identified/recognized using an artificial neural network (ANN). An example of such an ANN is a convolutional neural network (CNN) that can be trained to extract portions of images containing LED marks and/or identify the LED marks in the images.

For example, a set of images showing one or more users holding/wearing sensor devices in various poses and orientations can be initially annotated to indicate the locations of LED marks recognized by human operators. The annotated images can be used as a training set for a convolutional neural network (CNN) such that the differences between LED marks identified by the CNN and the annotated mark locations are reduced/minimized. The trained CNN can be subsequently used to identify the LED mark locations without further human assistance.

Similarly, images of human parts (e.g., arms, hands) annotated to identify their skeletons (e.g., bone lines) and/or orientations can be used to train a convolutional neural network (CNN) to predict the orientation of the human parts from images.

Figure 17:
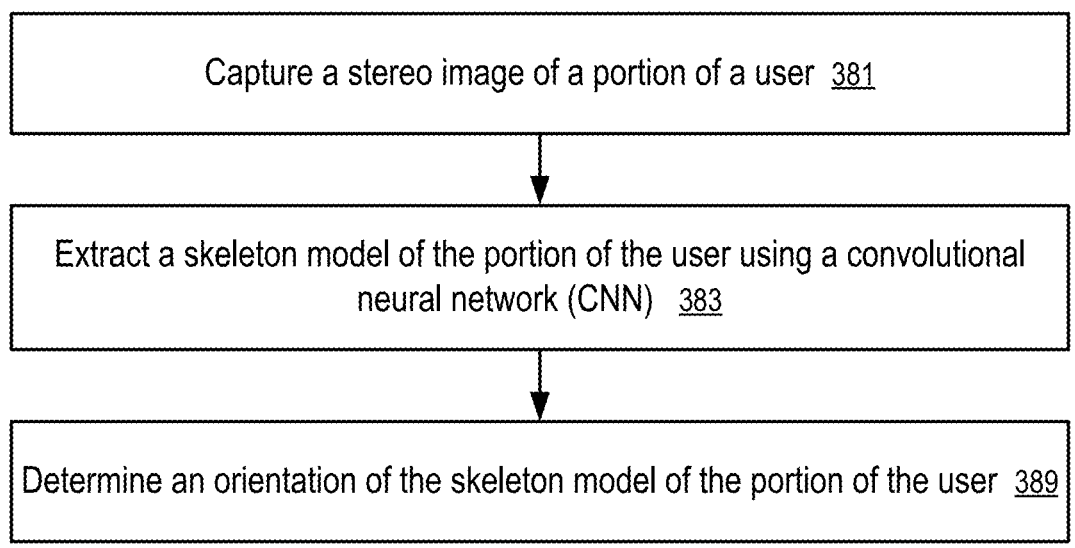
FIG. 17 shows a method to determine the orientation of a portion of a user according to one embodiment.

FIG. 17 shows a method to determine the orientation of a portion of a user according to one embodiment. For example, the method FIG. 17 can be used in a system of FIG. 2.

The method of FIG. 17 includes: capturing (381) a stereo image of a portion of a user; extract (383) a skeleton model of the portion of the user using a convolutional neural network (CNN); and determining (389) an orientation of the skeleton model of the portion of the user. The skeleton model extracted from the stereo image is typically a portion of the skeleton model of FIG. 3.

Using the above discussed techniques, the IMU measurements can be calibrated without requiring the user to perform an exact, predefined pose (e.g., a pose as illustrated in FIG. 1). Further, different modules can be calibrated separately while they are in the field of view of the stereo camera (126). The calibration can be performed in real time on an on-going basis. For example, the computing device (141) may instruct the camera (126) to take stereo images from time to time; and when a sensor module is found within a stereo image, the computing device (143) can perform a calibration calculation based on the stereo image and the orientation measurement generated by the sensor module at the time of the stereo image.

The present disclosure includes methods and apparatuses which perform these methods, including data processing systems which perform these methods, and computer readable media containing instructions which when executed on data processing systems cause the systems to perform these methods.

For example, the computing device (141), the arm modules (113, 115) and/or the head module (111) can be implemented using one or more data processing systems.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a plurality of sensor modules attached to a plurality of portions of a user, each respective sensor module in the plurality of sensor modules having an inertial measurement unit measuring an orientation of the inertial measurement unit relative to a reference orientation;
   a stereo camera; and a computing device coupled to the plurality of sensor modules and the stereo camera, the computing device configured to:
  instruct the respective sensor module to turn on a plurality of light-emitting diode (LED) lights, in response to a prediction that the user is to be in a calibration pose, for capturing a stereo image;
  capture, using the stereo camera, the stereo image of the respective sensor module attached to a respective portion of the user;
  obtain, from the respective sensor module, an orientation measurement generated by the inertial measurement unit of the respective sensor module at a time of capturing the stereo image;
  calculate, based on the stereo image, at least one orientation related to the respective sensor module attached to the respective portion of the user; and
  determine a rotation calibrating measurements of the inertial measurement unit relative to a common reference for the plurality of sensor modules, based on the orientation calculated based on the stereo image and based on the orientation measurement generated by the inertial measurement unit of the respective sensor module at the time of capturing the stereo image.

2. The system of claim 1, further comprising:
a head mount display having:
  the stereo camera; and
  the inertial measurement unit, wherein the orientation calculated based on the stereo image is transformed based at least in part on the orientation measurement that is generated by the inertial measurement unit of the head mount display at the time of capturing the stereo image.

3. The system of claim 2, wherein the common reference for calibrating the measurements of the inertial measurement unit of the respective sensor module is with respect to a first calibration pose of the user.

4. The system of claim 3, wherein the user pose at the time of capturing the stereo image is different from the first calibration pose.

5. The system of claim 4, wherein the rotation calibrating measurements of the inertial measurement unit relative to the common reference identifies a rotational transformation between:
  the reference orientation used by the inertial measurement unit of the respective sensor module in generating orientation measurements; and
  the common reference.

6. The system of claim 4, wherein the rotation calibrating measurements of the inertial measurement unit relative to the common reference identifies a rotational transformation between:
  the reference orientation used by the inertial measurement unit of the respective sensor module in generating orientation measurements; and
  the reference orientation relative to which the orientation based on the stereo image is calculated.

7. The system of claim 4, wherein the rotation calibrating measurements of the inertial measurement unit relative to the common reference identifies a wearing orientation of the respective sensor module with respect to the respective portion of the user to which the respective sensor module is attached.

8. The system of claim 4, wherein the computing device calculates, based on the stereo image, the orientation using a convolutional neural network (CNN).

9. The system of claim 8, wherein the convolutional neural network predicts a skeleton model of the respective portion of the user; and the orientation based on the stereo image identifies an orientation of the respective portion of the user based on the skeleton model predicted by the convolutional neural network.

10. The system of claim 8, wherein the respective sensor module has a plurality of optical marks; and the convolutional neural network extracts a portion of the stereo image that contains the optical marks.

11. The system of claim 8, wherein the respective sensor module has a plurality of optical marks; and the convolutional neural network identifies locations of the optical marks in the stereo images.

12. The system of claim 8, wherein the respective sensor module has the plurality of light-emitting diode (LED) lights; and the computing device is configured to instruct the respective sensor module to turn on the LED lights for capturing the stereo image and turn off the LED lights after capturing the stereo image.

13. A method, comprising:
communicating by a computing device with a stereo camera and a plurality of sensor modules attached to a plurality of portions of a user, wherein each respective sensor module in the plurality of sensor modules has an inertial measurement unit measuring an orientation of the inertial measurement unit relative to a reference orientation;
instructing the respective sensor module to turn on a plurality of light-emitting diode (LED) lights, in response to a prediction that the user is to be in a calibration pose, for capturing a stereo image;
capturing, using the stereo camera, the stereo image of the respective sensor module attached to a respective portion of the user;
obtaining, from the respective sensor module, an orientation measurement generated by the inertial measurement unit of the respective sensor module at a time of capturing the stereo image;
calculating, based on the stereo image, at least one orientation related to the respective sensor module attached to the respective portion of the user; and
determining a rotation calibrating measurements of the inertial measurement unit relative to a common reference for the plurality of sensor modules, based on the orientation calculated based on the stereo image and based on the orientation measurement generated by the inertial measurement unit of the respective sensor module at the time of capturing the stereo image.

14. The method of claim 13, wherein the respective sensor module has the plurality of light-emitting diode (LED) lights; and the method further comprises:
instructing the respective sensor module to turn on the LED lights for a duration of capturing the stereo images, wherein the LED lights are turned off before and after the duration.

15. The method of claim 14, wherein the orientation calculated from the stereo image is an orientation of the sensor module computed from locations of the LED lights captured in the stereo image.

16. The method of claim 15, further comprising:
determining the locations of the LED lights in the stereo image using a convolutional neural network (CNN).

17. The method of claim 16, wherein the capturing of the stereo image is in response to a determination to calibrate the inertial measurement unit of the respective sensor element; and the method further comprises:

analyzing the stereo image to determine whether the stereo image shows the respective sensor element, wherein the determining of the rotation calibrating measurements of the inertial measurement unit relative to the common reference is in response to a determination that the stereo image shows the respective sensor element.

18. The method of claim 13, further comprising:

instructing the user to make a pose that moves left and right arms of the user into a field of view of the stereo camera;

capturing a first stereo image of the user in the pose, wherein the user in the pose as shown in the first stereo image is substantially symmetric from left to right; and calibrating the common reference in accordance with a front facing direction identified in the first stereo image of the pose.

19. A non-transitory computer storage medium storing instructions which, when executed by a computing device, cause the computing device to perform a method, the method comprising:

communicating by the computing device with a stereo camera and a plurality of sensor modules attached to a plurality of portions of a user, wherein each respective sensor module in the plurality of sensor modules has an inertial measurement unit measuring an orientation of the inertial measurement unit relative to a reference orientation;

instructing the respective sensor module to turn on a plurality of light-emitting diode (LED) lights in response to a prediction that the user is to be in a calibration pose;

capturing, using the stereo camera, the stereo image of the respective sensor module attached to a respective portion of the user;

obtaining, from the respective sensor module, an orientation measurement generated by the inertial measurement unit of the respective sensor module at a time of capturing the stereo image;

calculating, based on the stereo image, at least one orientation related to the respective sensor module attached to the respective portion of the user; and determining a rotation calibrating measurements of the inertial measurement unit relative to a common reference for the plurality of sensor modules, based on the orientation calculated based on the stereo image and based on the orientation measurement generated by the inertial measurement unit of the respective sensor module at the time of capturing the stereo image.

20. The non-transitory computer storage medium of claim 19, wherein the calculating of the orientation is performed using a convolutional neural network (CNN).

* * * * *